(12) United States Patent
Ross et al.

(10) Patent No.: US 7,257,537 B2
(45) Date of Patent: Aug. 14, 2007

(54) METHOD AND APPARATUS FOR PERFORMING DIALOG MANAGEMENT IN A COMPUTER CONVERSATIONAL INTERFACE

(75) Inventors: Steven I. Ross, S. Hamilton, MA (US); Jeffrey G. MacAllister, Chestnut Hill, MA (US); Christopher A. Hyland, Foxboro, MA (US); Marijane M. Zeller, Medford, MA (US); Kathleen A. Howard, Burlington, MA (US)

(73) Assignee: International Business Machines Corporation, Armonk, NY (US)

( * ) Notice: Subject to any disclaimer, the term of this patent is extended or adjusted under 35 U.S.C. 154(b) by 533 days.

(21) Appl. No.: 10/044,647

(22) Filed: Jan. 10, 2002

(65) Prior Publication Data
US 2002/0133355 A1 Sep. 19, 2002

Related U.S. Application Data

(60) Provisional application No. 60/261,372, filed on Jan. 12, 2001.

(51) Int. Cl.
*G10L 11/00* (2006.01)

(52) U.S. Cl. ............... 704/270; 704/9; 704/257; 706/46

(58) Field of Classification Search ........... 704/257, 704/270, 9; 379/88.18; 710/54
See application file for complete search history.

(56) References Cited

U.S. PATENT DOCUMENTS

| | | | |
|---|---|---|---|
| 4,729,096 A | 3/1988 | Larson | |
| 4,736,296 A | 4/1988 | Katayama et al. | |
| 4,914,590 A | 4/1990 | Loatman et al. | |
| 5,101,349 A | 3/1992 | Tokuume et al. | |
| 5,239,617 A | 8/1993 | Gardner et al. | |
| 5,282,265 A | 1/1994 | Rohra Suda et al. | |

(Continued)

FOREIGN PATENT DOCUMENTS

WO  WO99/05671  2/1999

OTHER PUBLICATIONS

Spoken Language Dialog Systems, pp. 1-2, Nov. 15, 2000, http://www.mrig.edu.au/ltg/slp803D/class/Jones/overview.html (downloaded May 16, 2001).

(Continued)

*Primary Examiner*—Richemond Dorvil
*Assistant Examiner*—Brian L. Albertalli

(57) ABSTRACT

A dialog management system functions to manage the dialog between a user of a computer system and one or more speech enabled software applications. The user provides spoken input to a microphone connected to the computer system, and hears responses from one or more applications through a speaker connected to the computer system. The dialog management system includes a dialog manager, a turn manager, a speak queue, dialog contexts, and dialog state. The dialog manager provides top-level control of the dialog and stores responses based on the user's spoken input in a speak queue for later output to the user. The turn manager controls delivery of the responses to the user based on the dialog context and the dialog state, to provide a polite dialog with the user that enables the user to be in control of the dialog. The dialog context provides information about each dialog. The dialog state provides information about whose turn it is (computer or user) to speak.

20 Claims, 5 Drawing Sheets

U.S. PATENT DOCUMENTS

| | | | |
|---|---|---|---|
| 5,383,121 A | | 1/1995 | Letkeman |
| 5,386,556 A | | 1/1995 | Hedin et al. |
| 5,390,279 A | | 2/1995 | Strong |
| 5,642,519 A | | 6/1997 | Martin |
| 5,677,835 A | | 10/1997 | Carbonell et al. |
| 5,678,052 A | | 10/1997 | Brisson |
| 5,748,841 A | | 5/1998 | Morin et al. ............... 395/2.66 |
| 5,812,977 A | * | 9/1998 | Douglas ..................... 704/275 |
| 5,864,819 A | | 1/1999 | De Armas et al. |
| 5,867,817 A | | 2/1999 | Catallo et al. |
| 5,873,064 A | | 2/1999 | DeArmas et al. |
| 5,918,222 A | * | 6/1999 | Fukui et al. .................... 707/1 |
| 5,937,385 A | | 8/1999 | Zadrozny et al. |
| 5,960,384 A | | 9/1999 | Brash |
| 6,023,669 A | | 2/2000 | Suda et al. |
| 6,044,347 A | | 3/2000 | Abella et al. |
| 6,073,102 A | | 6/2000 | Block .......................... 704/275 |
| 6,138,100 A | | 10/2000 | Dutton et al. ............... 704/275 |
| 6,192,110 B1 | | 2/2001 | Abella et al. ............ 379/88.01 |
| 6,192,339 B1 | | 2/2001 | Cox |
| 6,208,972 B1 | | 3/2001 | Grant et al. |
| 6,233,559 B1 | | 5/2001 | Balakrishnan |
| 6,311,159 B1 | | 10/2001 | Van Tichelen et al. |
| 6,314,402 B1 | * | 11/2001 | Monaco et al. ............. 704/275 |
| 6,334,103 B1 | * | 12/2001 | Surace et al. ............... 704/257 |
| 6,466,654 B1 | * | 10/2002 | Cooper et al. ........... 379/88.01 |
| 6,505,162 B1 | * | 1/2003 | Wang et al. ................. 704/275 |
| 6,519,562 B1 | | 2/2003 | Phillips et al. |
| 6,542,868 B1 | * | 4/2003 | Badt et al. ................... 704/270 |
| 6,604,075 B1 | * | 8/2003 | Brown et al. ............. 704/270.1 |
| 6,647,363 B2 | * | 11/2003 | Claassen ......................... 704/1 |
| 6,721,706 B1 | * | 4/2004 | Strubbe et al. ............. 704/275 |
| 6,728,692 B1 | | 4/2004 | Martinka et al. |
| 6,748,361 B1 | * | 6/2004 | Comerford et al. ......... 704/275 |

OTHER PUBLICATIONS

McGlashan, S., "Towards Multimodal Dialog Management," Jun. 1996, Proceedings of Twente Workshop on Language Technology 11, pp. 1-10.

MSDN Online Web Workshop, Active Accessibility Support [online], [retrieved on May 30, 2001]. Retrieved from the Internet (URL:http://msdn.microsoft.com/workshop/browser/accessibility/overview/overview.asp) (6 pages).

Carasik, R.P., et al., "Towards a Domain Description Grammar: An Application of Linguistic Semantics," *ACM SIGSOFT, Software Engineering Notes*, 15(5):28-43 (Sep. 1, 1990).

Kamm, C.A., et al., "Design and Evaluation of Spoken Dialog Systems," *Proc. 1997 IEEE Workshop on Speech Recognition and Understanding*, pp. 11-18 (1997).

Young, S.R., et al., "Layering Predictions: Flexible Use of Dialog Expectation in Speech Recognition," *IJCAI*, pp. 1543-1549 (1989).

Young, S.R., et al., "High Level Knowledge Sources in Usable Speech Recognition Systems," *Communications of the ACM*, 32(2):183-194 (Feb. 1989).

\* cited by examiner

METHOD AND APPARATUS FOR PERFORMING DIALOG MANAGEMENT IN A COMPUTER CONVERSATIONAL INTERFACE

RELATED APPLICATION(S)

This application claims the benefit of U.S. Provisional Application No. 60/261,372, filed Jan. 12, 2001. This application is related to U.S. application Ser. No. 09/931,505, filed Aug. 16, 2001, U.S. application Ser. No. 10/004,289 filed Oct. 25, 2001 entitled "System and Method for Relating Syntax and Semantics for a Conversational Speech Application," concurrently filed U.S. application Ser. No. 10/044,760 entitled "Method and Apparatus for Converting Utterance Representations into Actions in a Conversational System," and concurrently filed U.S. application Ser. No. 10/044,464 entitled "System and Method for Deriving Natural Language Representation of Formal Belief Structures." The entire teachings of the above applications are incorporated herein by reference.

BACKGROUND OF THE INVENTION

Speech enabling mechanisms have been developed that allow a user of a computer system to verbally communicate with a computer system. Examples of speech recognition products that convert speech into text strings that can be utilized by software applications on a computer system include the ViaVoice™ product from IBM®, Armonk, N.Y., and NaturallySpeaking Professional from Dragon Systems, Newton, Mass.

In particular, a user may communicate through a microphone with a software application that displays output in a window on the display screen of the computer system. A software application then may respond to the user by producing a speech output that may be played through a speaker that is connected to the computer system. The user may again communicate to the software application and thus, a dialog or conversation develops between the user and the software application. In such a dialog, a software application typically tries to manage the dialog, that is, manage the flow of responses to the user. In particular, in some conventional systems, a dialog manager is part of the software application or provided as a separate piece of software that serves to control the dialog.

In a conventional dialog management approach, the dialog manager software may serve several functions. For example, dialog management software can manage the flow of the conversation while maintaining the history and context of the conversation. In addition, the dialog management software may direct the course of the conversation, access a database to obtain content that may be used in responses to the user, and formulate the responses based on that content, to be given back to the user. In general, the dialog management software is dependent upon explicit dialog definitions that are coded into the speech application. In order for the dialog to proceed, the user responds to these dialog speech definitions in a specific manner. Certain responses from the user are expected in the dialog definitions. Typically, the user receives a specific menu of options or expected responses, and the user responds by selecting from that menu. The user's input must fall within a certain expectation of responses that are coded in the dialog definitions.

In one conventional dialog management system, the menu is provided by a touch-tone voice menu such as typically available on touch-tone telephones. In these conventional systems, the user contacts an application by dialing up a phone number. The touch-tone voice menu then provides a menu of responses or selections for the user. The user must respond by choosing within the range of selections indicated by these voice menus.

SUMMARY OF THE INVENTION

A sophisticated conversational system requires coordination of the flow of questions and answers to and from the speech application hosted on a computer system. The present invention provides a dialog management component that manages the conversational traffic flow, while meeting the critical requirement of keeping the user (not the computer) always firmly in control. Most existing conversational systems fail to meet this requirement in one way or another. To ensure that the user is always in control, the dialog management component must direct the computer to perform the following high-level behaviors: (i) do not interrupt the user when the user is talking, (ii) speak when spoken to, (iii) ask permission before speaking delayed answers and notifications, (iv) always allow changes of subject or interruptions from the user, and (v) ask permission to re-ask questions that have been ignored.

In addition to these high-level behaviors, the dialog management system must conform to users' expectations of the natural "rhythm" of conversation: for example, allowing adequate time between utterances, taking "turns" in a dialog, etc.

The dialog management system is a component of a speech center including a conversation manager. In general, the dialog management component receives unrealized goals from a reasoning facility derived from spoken utterances (i.e., audible input) and achieves them through a controlled dialog with the user.

In coordination with other components of the conversation manager, the dialog management system uses a language generator to create natural languages questions and responses for the user. The dialog management system also creates new contexts for listening to the user responses, activates and manages text-to-speech resource, activates and manages graphical displays used as part of the dialog with the user, and modifies fragmentary propositions produced by semantic analysis to correspond to the dialog context. In addition, the dialog management system coordinates the delivery of questions, answers, results, and unanticipated announcements at the user's convenience, delivers process indications (such as "printing . . .") if a command is taking a significant time to execute, and tracks activities that have been initiated through user actions.

This dialog management solution of the present invention differs from other conventional solutions with respect to its separation of domain-dependent dialog functionality and knowledge from domain-independent dialog functionality and knowledge. Rather than building a dialog sequence into a "speech application," the dialog management system provides a shared resource or interface (like an operating system provides a user interface component). This dialog management interface is used to transform a "speech application" (containing no explicit dialog sequencing information) into a dialog-capable system that satisfies the high-level behavior requirements described above.

This dialog management solution ensures that the user is always in control. In many conventional speech applications, developers must "code" speech applications at a low level with explicit dialog definitions. In such a conventional approach, it is difficult to always let users do what they want.

In a conventional system, it is typical to develop speech applications that are much like touch-tone telephone voice menus, even though users typically do not like such systems and the lack of user control they embody.

The dialog management solution of the invention functions as part of a goal directed reasoning-based conversational speech center system that focuses specifically on dialog management. Most conventional dialog management systems attempt to do more than purely manage dialog, usurping some conversational system functionality, and in the process do not end up focusing sufficiently on dialog issues.

In one aspect of the present invention, a computer method and computerized interface is provided for managing a dialog between a computer and a user of the computer. The computer includes an audio input device (e.g., microphone) and an audio output device (e.g., speaker). In one aspect the computerized interface includes a speak queue, a dialog manager, and a turn manager. The speak queue retains responses (e.g., answers, questions, announcements) generated by the computer to spoken input from the user and received by the computer through the audio input device. The dialog manager places the generated responses in the queue. The turn manager manages audible rendering of the responses from the queue through the audio output device, so that the user receives each response as part of a dialog between the computer and the user, the turn manager conducting the dialog in a polite manner that is subject to control by the user. The polite manner of the turn manager is defined by behavioral goals (as discussed next).

In another aspect, the turn manager is subject to behavioral goals. The behavioral goals include providing speech output including audible renditions of the responses when spoken to by the user, asking permission of the user before providing speech output based on delayed answers and notifications, and allowing the user to (i) change subject and/or (ii) interrupt in the dialog.

The turn manager, in another aspect, provides the audible rendering of the responses in a delivery mode subject to selection by the user.

In a further aspect, the delivery mode is an immediate delivery mode or a delayed delivery mode.

In one aspect, the turn manager manages the audible rendering of the responses based on dialog states that specify the current state of the dialog between the computer and the user.

In another aspect, the response is an announcement of an event of interest to the user as determined by the computer.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
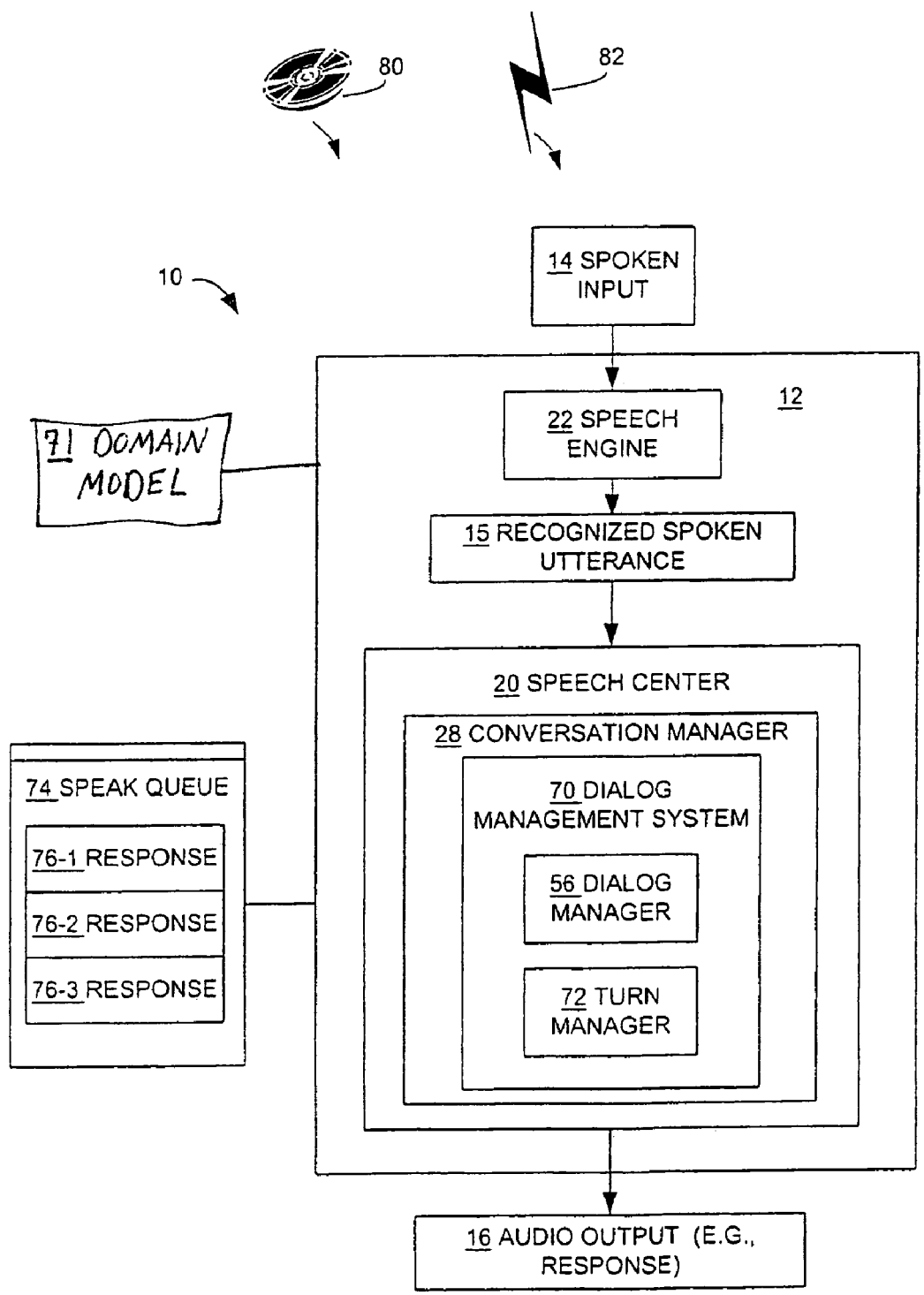
FIG. 1 is a block diagram of the components of a preferred embodiment in a computer system.

FIG. 1 is an illustration of a preferred embodiment in a computer system 10. Generally, the computer system 10 includes a digital processor 12 which hosts and executes a speech center system 20, conversation manager 28, and speech engine 22 in working memory. The input spoken utterance 14 is a voice command or other audible speech input from a user of the computer system 10 (e.g., when the user speaks into a microphone connected to the computer system 10) based on common language words. In one embodiment, the input 14 is not necessarily spoken, but is based on some other type of suitable input, such as phrases or sentences typed into a computer keyboard. The recognized spoken utterance 15 is a spoken input 14, recognized as a valid utterance by the speech engine 22. The speech center system 20 includes a conversation manager 28 which includes a dialog management system 70 that manages a dialog between a user who is the provider of the spoken input 14 and the computer system 10. The dialog management system 70 includes a dialog manager 56 and a turn manager 72. The dialog manager 56 provides top-level control of the dialog and stores responses 76 (e.g., 76-1, 76-2, and 76-3) based on the recognized spoken utterance 15 in a speak queue 74. The turn manager 72 controls delivery of the responses 76 as audio (e.g., speech) output 16 directed to the user (e.g., through a speaker connected to the computer system 10).

Figure 4:
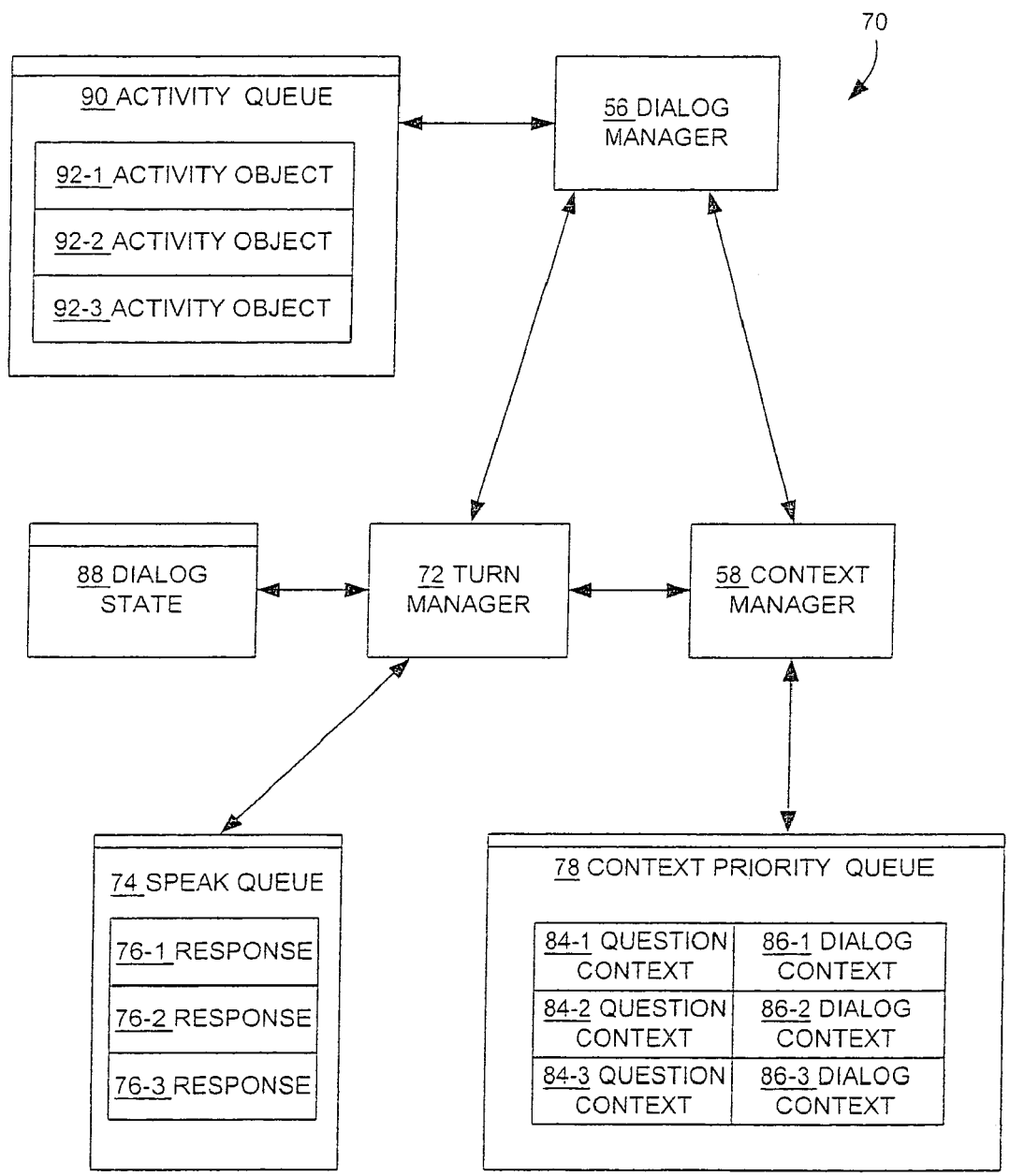
FIG. 4 is a block diagram the components of a dialog management system according to the present invention.

In one embodiment, a computer program product 80, including a computer usable medium (e.g., one or more CDROM's, diskettes, tapes, etc.), provides software instructions for the dialog management system 70 or any of its components (see FIG. 4). The computer program product 80 may be installed by any suitable software installation procedure, as is well known in the art. In another embodiment, the software instructions may also be downloaded over an appropriate connection. A computer program propagated signal product 82 embodied on a propagated signal on a propagation medium (e.g., a radio wave, an infrared wave, a laser wave, a sound wave, or an electrical wave propagated over the Internet or other network) provides software instructions for the dialog management system 70 or any of its components (see FIG. 4). In alternate embodiments, the propagated signal is an analog carrier wave or digital signal carried on the propagated medium. For example, the propagated signal may be a digitized signal propagated over the Internet or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer useable medium of the computer program product 80 is a propagation medium that the computer may receive and read, such as by receiving the propagation medium and identifying a propagated signal embodied in the propagation medium, as described above for the computer program propagated signal product 82.

Figure 2:
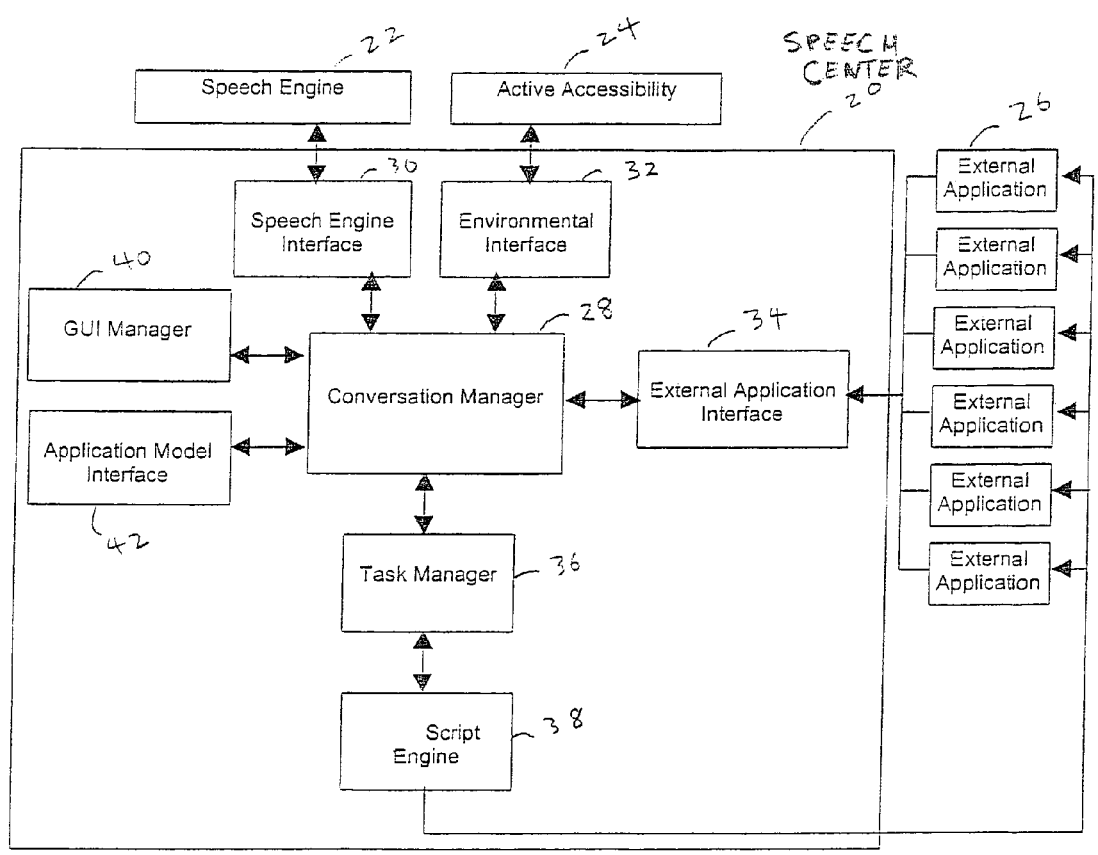
FIG. 2 is a block diagram of the components of the speech center system illustrated in FIG. 1.

FIG. 2 shows the components of a speech center system 20 configured according to the present invention. FIG. 2 also illustrates external applications 26 that communicate with the speech center 20, a speech engine 22, and an active accessability module 24. The speech center 20, speech engine 22, active accessability module 24, and external applications 26, in one aspect of the invention, may be hosted on one computer system 10. In another embodiment, one or more of the external applications 26 may be hosted and executed by a different digital processor than the digital processor 12 that hosts the speech center 20. Generally, the speech center 20 (and its individual components) may be implemented as hardware or software. The speech center 20 includes a conversation manager 28, speech engine interface 30, environmental interface 32, external application interface 34, task manager 36, script engine 38, GUI manager 40, and application module interface 42.

The speech engine interface module 30 encapsulates the details of communicating with the speech engine 22, isolating the speech center 20 from the speech engine 22 specifics. In a preferred embodiment, the speech engine 22 is ViaVoice™ from IBM®.

The environmental interface module 32 enables the speech center 20 to keep in touch with what is happening on the user's computer. Changes in window focus, such as dialogs popping up and being dismissed, and applications 26 launching and exiting, must all be monitored in order to interpret the meaning of voice commands. A preferred embodiment uses Microsoft® Active Accessibility® (MSAA) from Microsoft Corporation, Redmond, Wash., to provide this information, but again flexibility to change this or incorporate additional information sources is desirable.

The script engine 38 enables the speech center 20 to control applications 26 by executing scripts against them. The script engine 38 provides the following capabilities: The script engine 38 supports cross-application scripting via OLE (Object Linking and Embedding) automation or through imported DLL's (Dynamic Link Libraries). It is capable of executing arbitrary strings representing well formed script engine 38 statements. This enables the speech center 20 to easily compose calls to respective application operations and invoke them. The script engine 38 environment also allows the definition of new subroutines and functions that combine the primitive functionality provided by applications 26 into actions that more closely correspond to those that a user might talk about. While the speech center 20 is a script-enabled application, this does not mean that the applications 26 that it controls needs to be script-enabled. In the preferred embodiment, the script engine 38 is a LotusScript engine from IBM, and so long as an application 26 provides an OLE automation or DLL interface, it will be controllable by the speech center 20. In other embodiments, the script engine 38 is a Visual Basic, Javascript, or any other suitable scripting engine.

The task manager 36 controls script execution through the script engine 38. The task manager 36 provides the capability to proceed with multiple execution requests simultaneously, to queue up additional script commands for busy applications 26, and to track the progress of the execution, informing the clients when execution of a script is in progress or has completed.

The external application interface 34 enables communications from external applications 26 to the speech center 20. For the most part, the speech center 20 can operate without any modifications to the applications 26 it controls, but in some circumstances, it may be desirable to allow the applications 26 to communicate information directly back to the speech center 20. The external application interface 34 is provided to support this kind of push-back of information. This interface 34 allows applications 26 to load custom grammars, or define task specific vocabulary. The external application interface 34 also allows applications 26 to explicitly access the speech center 20 for speech recognition and synthesis services.

The application model interface 42 provides models for applications 26 communicating with the speech center 20. The power of the speech center 20 derives from the fact that it has significant knowledge about the applications 26 it controls. Without this knowledge, it would be limited to providing little more than simplistic menu based command and control services. Instead, the speech center 20 has a detailed model (e.g., as part of a domain model 71 (see FIG. 1)) of what a user might say to a particular application 26, and how to respond. That knowledge is provided individually on an application 26 by application 26 basis, and is incorporated into the speech center 20 through the application model interface 42.

The GUI manager 40 provides an interface to the speech center 20. Even though the speech center 20 operates primarily through a speech interface, there will still be some cases of graphical user interface interaction with the user. Recognition feedback, dictation correction, and preference setting are all cases where traditional GUI interface elements may be desirable. The GUI manager 40 abstracts the details of exactly how these services are implemented, and provides an abstract interface to the rest of the speech center 20.

The conversation manager 28 is the central component of the speech center 20 that integrates the information from all the other modules 30, 32, 34, 36, 38, 40, 42. In a preferred embodiment, the conversation manager 28 is not a separate component, but is the internals of the speech center 20. Isolated by the outer modules from the speech engine 22 and operating system dependencies, it is abstract and portable. When an utterance 15 is recognized, the conversation manager 28 combines an analysis of the utterance 15 with information on the state of the desktop and remembered context from previous recognitions to determine the intended target of the utterance 15. The utterance 15 is then translated into the appropriate script engine 38 calls and dispatched to the target application 26. The conversation manager 28 is also responsible for controlling when dictation functionality is active, based on the context determined by the environmental interface 32.

Figure 3:
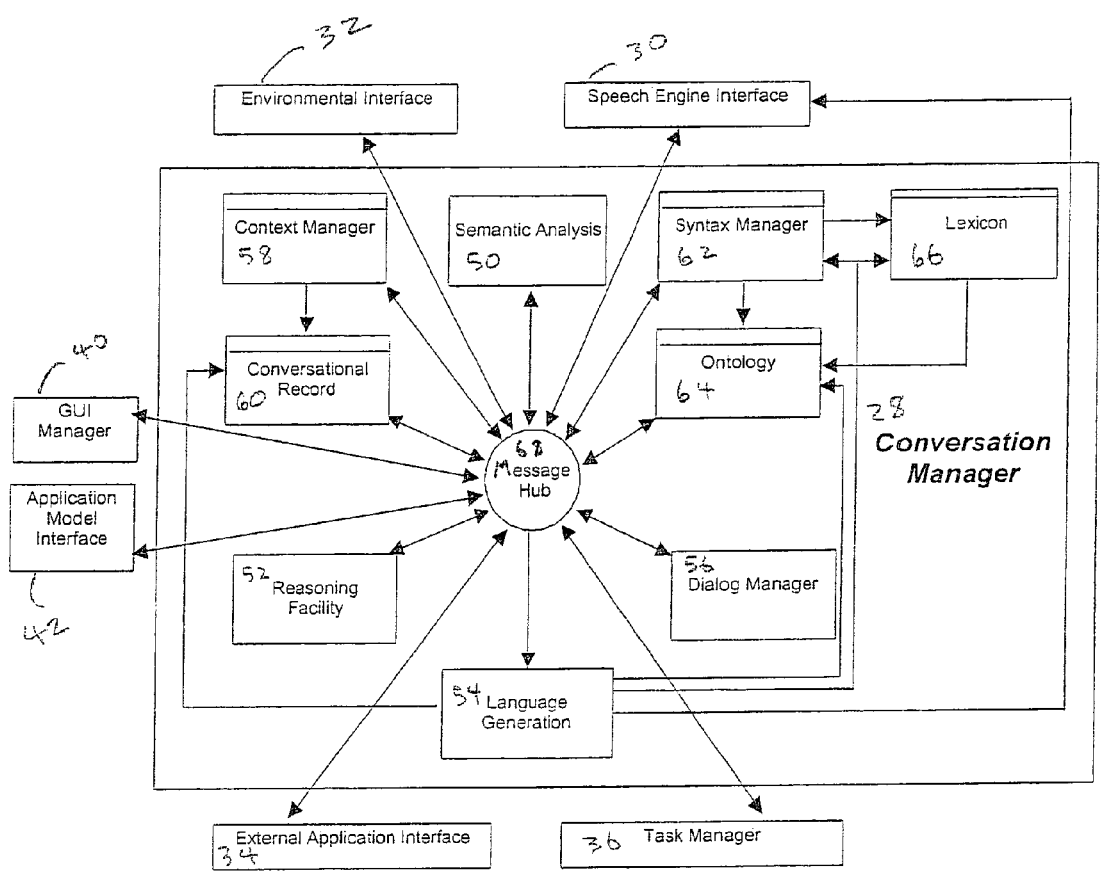
FIG. 3 is a block diagram of the components of the conversation manager illustrated in FIG. 2.

FIG. 3 represents the structure of the conversation manager 28 in a preferred embodiment. Each of the functional modules, such as the semantic analysis module 50, reasoning facility module 52, language generation module 54, and dialog manager 56, are indicated by plain boxes without a bar across the top. Data abstraction modules, such as the context manager 58, the conversational record 60, the syntax manager 62, the ontology module 64, and the lexicon module 66 are indicated by boxes with a bar across the top. The modules 52 through 68 of the conversation manager 28 are described below.

The message hub 68 includes message queue and message dispatcher submodules. The message hub 68 provides a way for the various modules 30, 32, 34, 36, 40, 42, and 50 through 64 to communicate asynchronous results. The central message dispatcher in the message hub 68 has special purpose code for handling each type of message that it might receive, and calls on services in other modules 30, 32, 34, 36, 40, 42, and 50 through 64 to respond to the message. Modules 30, 32, 34, 36, 40, 42, and 50 through 64 are not restricted to communication through the hub. They are free to call upon services provided by other modules (such as 30, 32, 34, 36, 40, 42, 52, 54, 56, 58, 60, 62, 64 or 66) when appropriate.

The context manager module 58 keeps track of the targets of previous commands, factors in changes in the desktop environment, and uses this information to determine the target of new commands. One example of a context manager 58 suitable for use with the invention is described in copending, commonly assigned U.S. patent application Ser. No. 09/931,505, filed Aug. 16, 2001, entitled "System and Method for Determining Utterance Context in a Multi-Context Speech Application," the entire teachings of which are incorporated herein by reference.

The domain model 71 (see FIG. 1) is a model of the "world" (e.g., concepts, one or more grammatic specifications, and a semantic specification) of one or more speech-enabled applications 26. In one embodiment, the domain model 71 is a foundation model including base knowledge common to many applications 26. In a preferred embodiment, the domain model 71 is extended to include application specific knowledge in an application domain model for each external application 26.

In a conventional approach, all applications 26 have an implicit model of the world that they represent. This implicit model guides the design of the user interface and the functionality of the program. The problem with an implicit model is that it is all in the mind of the designers and developers, and so is often not thoroughly or consistently implemented in the product. Furthermore, since the model is not represented in the product, the product cannot act in accordance with the model's principles, explain its behavior in terms of the model, or otherwise be helpful to the user in explaining how it works.

In the approach of the present invention, the speech center system 20 has an explicit model of the world (e.g., domain model 71) which will serve as a foundation for language understanding and reasoning. Some of the basic concepts that the speech center system 20 models using the domain model 71 are:

| | |
|---|---|
| Things | A basic category that includes all others |
| Agents | Animate objects, people, organizations, computer programs |
| Objects | Inanimate objects, including documents and their sub-objects |
| Locations | Places in the world, within the computer, the network, and within documents |
| Time | Includes dates, as well as time of day. |
| Actions | Things that agents can do to alter the state of the world |
| Attributes | Characteristics of things, such as color, author, etc. |
| Events | An action that has occurred, will occur, or is occurring over a span of time. |

These concepts are described in the portion of the domain model 71 known as the ontology 64 (i.e., based on an ontological description). The ontology 64 represents the classes of interest in the domain model 71 and their relationships to one another. Classes may be defined as being subclasses of existing classes, for example. Attributes can be defined for particular classes, which associate entities that are members of these classes with other entities in other classes. For example, a person class might support a height attribute whose value is a member of the number class. Height is therefore a relation which maps from its domain class, person, to its range class, number.

Although the ontology 64 represents the semantic structure of the domain model 71, the ontology 64 says nothing about the language used to speak about the domain model 71. That information is contained within the syntax specification. The base syntax specification contained in the foundation domain model 71 defines a class of simple, natural language-like sentences that specify how these classes are linked together to form assertions, questions, and commands. For example, given that classes are defined as basic concepts, a simple form of a command is as follows:

template command (action)
    <command>=<action> thing(action.patient)? manner(action)*.

Based on the ontology definitions of actions and their patients (the thing acted upon by an action) and on the definition of the thing and manner templates, the small piece of grammar specification shown above would cover a wide range of commands such as "move down" and "send this file to Kathy".

To describe a new speech-enabled application 26 to the conversation manager 28, a new ontology 64 for the application 26 describes the kinds of objects, attributes, and operations that the application 26 makes available. To the extent that these objects and classes fit into the built-in domain model hierarchy, the existing grammatical constructs apply to them as well. So, if an application 26 provides an operation for, say, printing it could specify:

print is a kind of action.
file is a patient of print.

and commands such as "print this file" would be available with no further syntax specification required.

The description of a speech-enabled application 26 can also introduce additional grammatical constructs that provide more specialized sentence forms for the new classes introduced. In this way, the description includes a model of the "world" related to this application 26, and a way to talk about it. In a preferred embodiment, each supported application 26 has its own domain model 71 included in its associated "application module description" file (with extension "apm").

The speech center 20 has a rudimentary built-in notion of what an "action" is. An "action" is something that an agent can do in order to achieve some change in the state of the world (e.g., known to the speech center 20 and an application 26). The speech center 20 has at its disposal a set of actions that it can perform itself. These are a subclass of the class of all actions that the speech center 20 knows about, and are known as operations. Operations are implemented as script functions to be performed by the script engine 38. New operations can be added to the speech center 20 by providing a definition of the function in a script, and a set of domain rules that describe the prerequisites and effects of the operation.

By providing the speech center system 20 with what is in effect "machine readable documentation" on its functions, the speech center 20 can choose which functions to call in order to achieve its goals. As an example, the user might ask the speech center system 20 to "Create an appointment with Mark tomorrow." Searching through its available rules the speech center 20 finds one that states that it can create an appointment. Examining the rule description, the speech center 20 finds that it calls a function which has the following parameters: a person, date, time, and place. The speech center 20 then sets up goals to fill in these parameters, based on the information already available. The goal of finding the date will result in the location of another rule which invokes a function that can calculate a date based on the relative date "tomorrow" information. The goal of finding a person results in the location of a rule that will invoke a function which will attempt to disambiguate a person's full name from their first name. The goal of finding the time will not be satisfiable by any rules that the speech center 20 knows about, and so a question to the user will be generated to get the information needed. Once all the required information is assembled, the appointment creation function is called and the appointment scheduled.

One of the most important aspects of the domain model 71 is that it is explicitly represented and accessible to the speech center system 20. Therefore, it can be referred to for help purposes and explanation generation, as well as being much more flexible and customizable than traditional programs.

FIG. 4 illustrates the dialog management system 70. The dialog management system 70 is a connection of modules 56, 58, 72, 74, 78, 88, and 90 that together provide the dialog management capabilities needed to handle conversational interactions with the user. The dialog management system 70 includes the a dialog manager 56, a turn manager 72, a speak queue 74, context priority queue 78, question contexts 84 (e.g., 84-1, 84-2, and 84-3), dialog contexts 86 (e.g., 86-1, 86-2, and 86-3), responses 76 (e.g., 76-1, 76-2, and 76-3), dialog state 88, activity queue 90, and activity objects 92 (e.g., 92-1, 92-2, 92-3). The speak queue 74, dialog state 88, activity queue 90, and context priority queue 78 are all data abstraction modules.

The dialog manager 56 provides top-level control of the dialog. The turn manager 72 provides a finite state machine using information about the dialog state to control delivery of responses 76 to the user. The speak queue 74 maintains a prioritized list of responses 76 (e.g., 76-1, 76-2, 76-3) to be provided to the user. The dialog context 86 (e.g., 86-1, 86-2, 86-3) provides information kept about each dialog. The response 76 is information about a single computer-spoken question, answer, announcement, or other suitable response. The dialog state 88 provides information about whose turn it is (i.e., computer or user), who is speaking and whether notifications should be deferred.

The dialog management system 70 maintains a close relationship with the context manager 58 and makes use of the context manager 58 priority queue (or context list) 78 as a dialog stack, maintaining the priority of dialog context objects 86.

The following describes how the major modules 56, 58, 72, 74, 78, 88, and 90 are used for question handling, result handling, announcements, speech output and activity tracking.

The dialog manager 56 recognizes a variety of question types, including disambiguation (choosing between alternatives), verification (a yes/no question to validate a command or information), correction (to obtain a different response when a user gives incorrect commands or information), and inquisition (obtaining missing information). Responses to each of these question types are handled by the dialog manager 56, based on the recognition context.

The dialog manager 56 receives question goals, one at a time, from the reasoning facility 52 of the conversational manager 28. The dialog manager 56 then decides which kind of question should be asked. The dialog manager 56 uses the goal type to decide which object method (e.g., software routine or procedure) of the dialog manager object 56 to invoke. The dialog manager 56 decides between invoking the disambiguator method (for disambiguation goals), the verifier method (for verification or boolean proposition goals), the corrector method (for correction goals) or the inquisitor method (for slot-name questions about variable proposition goals). The object method chosen by the dialog manager 56 uses the language generator 54 to create a question string for the user, and places a response object 76 containing the question string on the speak queue 74. The turn manager 72 services the speak queue 74 and tells the text-to-speech service (e.g., speech engine 22) to speak the string at the next appropriate time (as well as activating the question context 84, if any are associated with the response object 76). For some questions (where the expected answer is not handled by the grammar of the particular application), the dialog manager 56 tells the context manager 58 to create a new question context 84 in the dormant state, and associate it with the given application (which also has a normal context 84, and possibly other pending question contexts 84.) The chosen dialog manager 56 method also creates a new dialog context object 86, and associates it with the new question context 84. The priority queue 78 of the context manager 58 deals appropriately with nested dialogs, and the dialog context object 86 is used by the dialog manager 56 to track the state of the conversation.

In a preferred embodiment, every recognized spoken utterance 15 from the user is semantically analyzed and converted to a set of propositions which are then passed to the dialog management system 70. For normal utterances 15, such as commands and questions, the propositions based on an utterance 15 are forwarded to the appropriate reasoning component (e.g., reasoning facility 52) for interpretation. When utterances 15 represent answers to questions, the dialog manager 56 processes the (possibly fragmentary) propositions based on an utterance 15 along with the original goal from the question context to generate a "full sentence answer" that can then be forwarded to the reasoning component 52 for further processing.

For some questions, based on user preferences and properties of the available user interface, the dialog manager 56 may choose to display a graphical window (particularly for choices based on long lists). In this case, when the dialog manager 56 creates a question context 84 then it also associates a dialog window with the context question 84, and it creates a graphical display (or if the display is already on screen, makes sure the display is visible and in focus). If the user chooses to deal with the dialog window via voice, the context manager 58 passes recognized propositions through the dialog manager 56 for the question contexts 84, as above. If the user chooses to deal with the dialog window via keyboard/mouse, "click stream" messages are passed to the dialog manager 56 (the messages will include a pointer to the dialog window, so that information like "current selection" can be extracted), which uses the gesture interpreter method. The dialog manager 56 then returns an appropriate proposition to be passed on to the conversational system 28. As used herein, the term "dialog window" above should not be taken literally, and includes such typical UI (user interface) features as "folders."

Based on user preferences and properties of the available interface, the announcer may choose to display the answer string in a graphical window.

The dialog manager 56 provides progress indications if a command has started successfully, and is taking a significant time (as specified in a user preference) to execute. For a given command action, in a preferred embodiment, the present participle form (e.g., "printing") is customarily used in English in the progress message provided to the user.

Other announcements include error conditions, general application announcements ("You've got three new mail messages"), and action completion for long duration activities.

For general application announcements, the dialog manager 56 receives an application announcement request from the message hub 68 and then uses the language generation module 54 to produce the announcement string. The dialog manager 56 then puts a response object 76 containing the announcement string on the speak queue 74, and the turn manager 72 tells the text-to-speech service (e.g., speech engine 22) to speak the announcement string at the next appropriate time to the user.

For error conditions, the dialog manager 56 receives an error announcement request and then gets an error string from the language generator module 54, puts a response object 76 containing the error string on the speak queue 74. The turn manager 72 tells the text-to-speech service (e.g., speech engine 22) to speak the error string at the next appropriate time.

When the conversational system 28 needs to deliver questions, results and announcements to the user, it must observe human standards of courtesy and deference. Interruption (e.g., "barge-in") by the user must also be supported when permitted by the hardware (some audio boards are half duplex and cannot talk and listen at the same time). The dialog manager 56 (through functionality in the turn manager 72) provides both immediate and delayed delivery modes as described in the following:

The immediate delivery mode (during a user-definable period of quiet, typically a few seconds) is used if the output is in response to a recent command or question. The term "recent" is defined based on both the $n^{th}$ most recent command or question, and within a certain number of seconds (both user definable). Typical defaults are n=1, and 10 seconds, respectively.

The delayed delivery mode is used after a notification (digitized audio or synthesized utterance—user preference) and user "go ahead" if significant time has gone by, or the user has given another n commands or questions in the interim.

The turn manager 72 uses the dialog state object 88 to track the temporal and event-related state of the conversation.

When a user has been away from the computer for a while (as evidenced by a lack of vocal or keyboard/mouse activity), the turn manager 72 defers notifications. When user activity (e.g., keyboard, mouse, or voice input to the computer or ambient noise) is again detected, the turn manager 72 resumes notifications. If there are messages pending, a notification should be given by the turn manager 72 when there is an appropriate vocal pause.

The user can also explicitly request the turn manager 72 to defer notification with phrases like "Good bye," "No interruptions" or "Not now." Later, the user can explicitly request the turn manager 72 to resume notifications and inquire whether there is any queued up speech output in the speak queue 74 (for example, after being away from the computer for a while) with phrases like "Do you have anything for me?" or "Go ahead."

In a preferred embodiment, for the text-to-speech resource (e.g., speech engine 22), the turn manager 72 gives the following priority to different responses in the speak queue 74 (a value of "1" indicates the highest priority and a value of "6" indicates the lowest priority) as indicated in the following:

1. Immediate answers to user questions
2. Computer questions to user about current dialog
3. Delayed answers to user questions
4. Delayed questions to user about persisting dialogs
5. Progress notifications
6. General application notifications In providing answers, the turn manager 72 should give priority to those answers associated with contexts 84 that are higher on the context priority queue 78.

When the turn manager 72 services the speak queue 74, the turn manager 72 can put appropriate pauses in between messages. The turn manager 72 provides a mechanism to jump answers to the front of the queue 74, ahead of questions. The turn manager 72 also supports interruption (e.g., barge-in), so that if a message is interrupted by the user, the turn manager 72 reschedules the full message on the speak queue 74 for delivery at a later, more appropriate time.

In the interest of numerous or longer messages, the turn manager 72 also provides VCR-like control functionality so that the user can perform such functions as pause, resume, repeat, skip, by giving commands during playback.

The dialog management system 70 tracks all activities the system 70 is currently engaged in. Doing so provides several important services to the user as described in the following:

Cancellation of ongoing activities gives the user the ability to say "never mind" or "cancel" thus instructing the dialog management system 70 to stop one or more activities. This cancellation function is appropriate when the dialog management system 70 misrecognizes a command, and then asks a question in the process of attempting to do something the user did not request in the first place. In one embodiment, the user can instruct the dialog management system 70 to cancel all current activities (i.e., clear out the activity queue 90).

The dialog management system 70 provides progress reports about activities, and makes an announcement based on timing how long an overall activity took.

The user can also ask the dialog management system 70 what it is doing.

Since the user is not required to answer questions, the dialog management system 70 has a tendency toward accumulating unanswered questions. The dialog management system 70 revisits these questions and insures that they are ultimately answered or canceled.

The dialog management system 70 maintains a queue 90 of activity objects 92 (e.g., 92-1, 92-2, 92-3) (different from the speak queue 74). Each activity object 92 contains a pointer back to the originating utterance in the conversational record 60, its associated external goal, a time stamp, a list of related questions, and a series of flags indicating what the dialog management system 70 has done with this activity 92.

The activity queue 90 is ordered based on recency. Interactions in service of a particular activity 92, such as questions, move the activity 92 to the head of the queue 90 and reset its time stamp. Questions do not represent new activities 92, but do get indexed under the parent activity 92.

Figure 5:
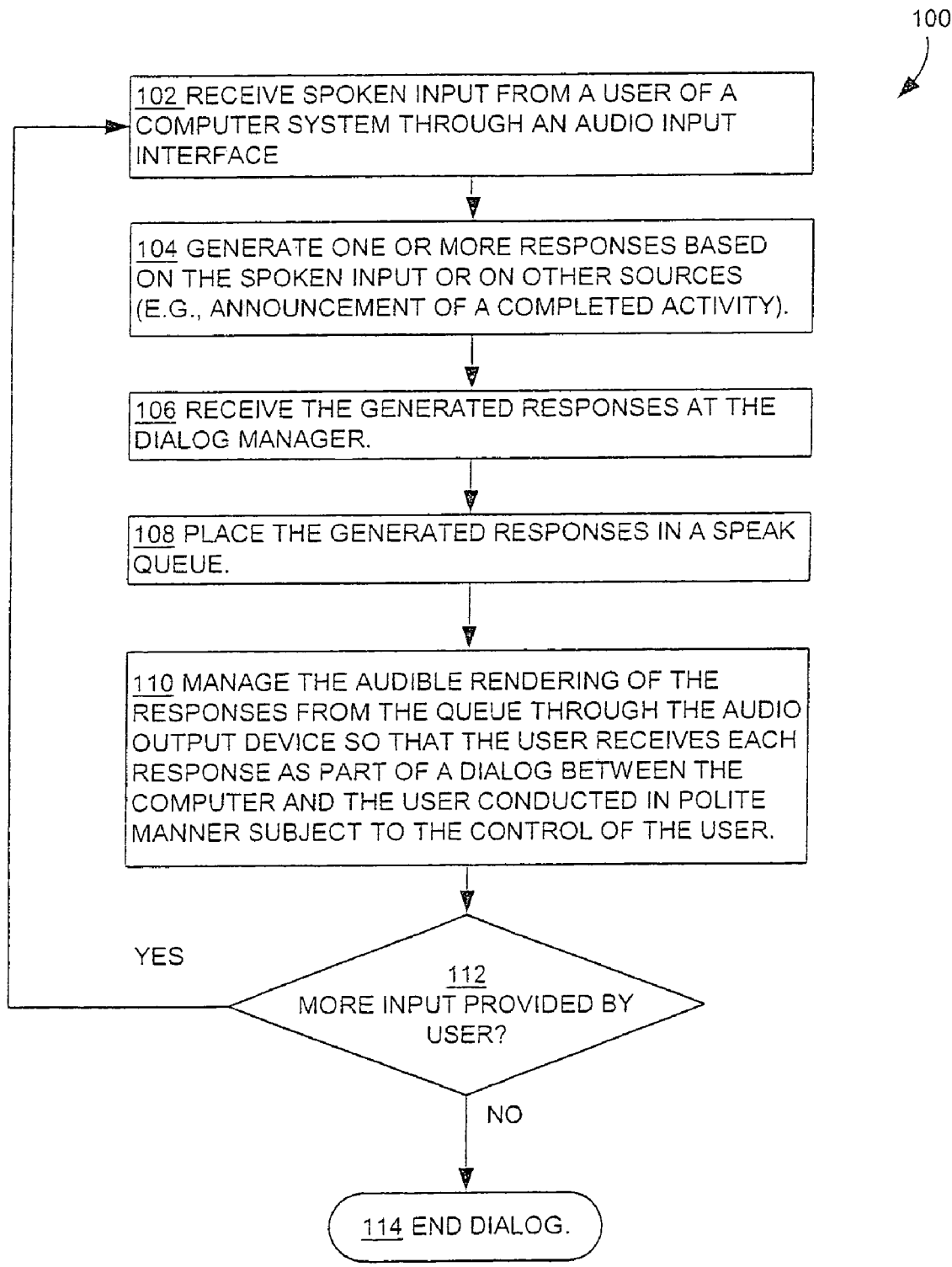
FIG. 5 is a flow chart of a procedure for managing a dialog between a computer and a user of the computer.

FIG. 5 is a flow chart of a procedure 100 for managing a dialog that may emerge between a computer 10 and a user of the computer 10. In step 102, the computer 10 receives a spoken input 14 from a user of the computer 10 through an audio input interface associated with the computer 10. A speech engine 22 processes the spoken input 14 and passes a recognized spoken utterance 15 based on the spoken input 14 to a speech center system 20 for further processing.

In step 104, the conversation manager 28 of the speech center system 20 generates one or more responses 76 to the spoken input 14. In one example of the process of step 104, the conversation manger 28 processes the recognized spoken utterance 15 to produce an internal utterance representation. The conversation manager 28 processes the utterance representation through the reasoning facility 52 to produce one or more responses 76 (e.g., a question, message, announcement, or other response for the user of the computer 10).

Generally, the conversation manager 28 may be generating multiple responses 76 based on the spoken input 14 and other sources. The conversation manager 28 may receive an indication that some activity that the user had previously requested (in a previous spoken input 14) is now completed. The conversation manager 28 thus provides a response 76 indicating that an announcement (of the completed activity) should be made to the user.

In step 106, the dialog manager 56 of the dialog management system 70 receives the generated response 76. For example, the dialog manager 56 receives a response representation from the reasoning facility 52, and calls the language generation module 54 to process the response representation into a natural language response 76 (e.g., response text in a natural language format that is understandable to the user of the computer 10). In another embodiment, the dialog manager 56 receives a generated response 76 that is already in a natural language format (that is, may receive a generated response 76 that has already been processed by the natural language module 54).

In step 108, the dialog manager 56 places the generated responses 76 in a speak queue 74. The speak queue 74 stores the generated responses 76 until the dialog manger 56 selects a response (e.g., 76-1) from the queue 74 to be output to the user of the computer 10, as described in the next step (110).

In step 110, the dialog manager 56 manages the audible rendering of the responses 76 from the speak queue 74 through the audio output device (e.g., audio speaker) associated with the computer 10. The speech engine 22 processes the response 76 to convert the response 76 (e.g., text format) into a format (e.g., audio file) to be output to the user of the computer 10. The dialog manager 56 manages the selecting and timing of the delivery of the responses 76 so that the user of the computer 10 hears each response 76 as part of a dialog between the computer 10 and the user conducted in a polite manner subject to the control of the user.

To ensure that the user is always in control, the dialog manager 56 uses the following high-level behaviors, which defined the polite manner of behavior that the turn manager 72 and dialog manager 56 engage in, as follows: (i) do not interrupt the user when the user is talking, (ii) speak when spoken to, (iii) ask permission before speaking delayed answers and notifications, (iv) always allow changes of subject or interruptions from the user, and (v) ask permission to re-ask questions that have been ignored. In addition to these high-level behaviors, the dialog manager 56 must conform to users' expectations of the natural "rhythm" of conversation: for example allowing adequate time between utterances, taking "turns" in a dialog, etc. In general, this model of polite behavior is referred to as a "polite English butler" model, which indicates the overall goal of modeling the behavior of the computer 10 during the dialog with the user on the polite behavior of the traditional English butler.

In step 112, the dialog management system 70 determines if there is more input to be provided by the user. For example, if the dialog manger 56 manages the speak queue 74 to select a response (e.g., 76-1) that is a question for the user, then the user is likely to provide a spoken input 14 that is a reply to that question. In this case, the procedure 100 returns to step 102 to receive the spoken input 14 and process the spoken input 14 through steps 104 through 110.

If the speak queue 74 is empty and the user does not provide any further spoken input 14 (e.g., for a predetermined period of time), then the dialog can be considered over (see step 114). The user may provide new spoken input 14, which may then cause another dialog to emerge from the procedure 100. Also, the computer 10 may provide a response 76, such as an announcement of interest to the user (e.g., that it is time for previously scheduled meeting), announcement of a message from another user (e.g., electronic mail or notes message), or report on an activity previously requested for the computer 10 to perform (e.g., processing of a query for a database).

While this invention has been particularly shown and described with references to preferred embodiments thereof, it will be understood by those skilled in the art that various changes in form and details may be made therein without departing from the scope of the invention encompassed by the appended claims.

For example, the spoken input 14 to the computer 10 can be in different formats, such as text typed in on the keyboard, and the output 16 can be in different formats, such as text displayed on the display of the computer 10. A dialog, as described in the procedure 100 for FIG. 5, can emerge from the interactions of the user and the computer 10 regardless of the specific format of the dialog (audio, text, or other format).

What is claimed is:

1. A computerized interface for managing a dialog between a computer and a user of the computer, the computer having an audio input device, a text input device, a visual output device, and an audio output device, the computerized interface comprising:

a prioritized speak queue for retaining responses generated by the computer in response to spoken input from the user asynchronously received by the computer through the audio input device, the responses including responses that can be spoken by a text to speech device, the spoken input being interpreted by a reasoning facility which enables the spoken input to include questions by the user, the computer running multiple applications and the reasoning facility interpreting the spoken input in a manner that at least one of the multiple applications recognizes the interpreted spoken input;

a dialog manager for placing the generated responses in the prioritized speak queue; and a turn manager for managing audible rendering of the responses from the prioritized speak queue through the audio output device, the turn manager prioritizing audible rendering of the responses according to rules other than the order in which the responses are added to the prioritized speak queue and according to corresponding contexts in a context priority queue so that the user receives each response as part of an asynchronous dialog between the computer and the user, the turn manager conducting the dialog in a polite non-interruptive manner that is subject to control by the user including allowing the user to change subjects and allowing the user to interrupt the dialog but not allowing the audible rendering of a response to interrupt the user.

2. The interface of claim 1, wherein the turn manager is subject to behavioral goals that include:
providing speech output including audible renditions of the responses when spoken to by the user;
asking permission of the user before providing speech output based on delayed answers and notifications; and
allowing the user to (i) change subject and/or (ii) interrupt in the dialog.

3. The interface of claim 1, wherein the turn manager provides the audible rendering of the responses in a delivery mode subject to selection by the user.

4. The interface of claim 3, wherein the delivery mode is one of an immediate delivery mode and a delayed delivery mode.

5. The interface of claim 1, wherein the turn manager manages the audible rendering of the responses based on dialog states that specify the current state of the dialog between the computer and the user.

6. The interface of claim 1, wherein the response is an announcement of an event of interest to the user as determined by the computer.

7. The interface of claim 1, wherein the dialog manager and the turn manager have access to application specific knowledge in an application domain model for external applications.

8. A method for managing a dialog between a computer and a user of the computer, the computer having an audio input device, a text input device, a visual output device, and an audio output device, the method comprising the computer-implemented steps of:
receiving responses generated by the computer, the responses including responses that can be spoken by a text to speech device, in response to spoken input from the user asynchronously received by the computer through the audio input device;
placing the generated responses in a prioritized speak queue, the spoken input being interpreted by a reasoning facility which enables the spoken input to include questions by the user, the computer running multiple applications and the reasoning facility interpreting the spoken input in a manner that at least one of the multiple applications recognizes the interpreted spoken input; and
managing audible rendering of the responses from the prioritized speak queue through the audio output device, prioritizing the audible rendering of the responses according to rules other than the order in which the responses are added to the prioritized speak queue and according to corresponding contexts in a context priority queue so that the user receives each response as part of an asynchronous dialog between the computer and the user, the dialog conducted in a polite non-interruptive manner that is subject to control by the user including allowing the user to change subjects and allowing the user to interrupt the dialog but not allowing the audible rendering of a response to interrupt the user.

9. The method of claim 8, wherein the step of managing the audible rendering of the responses is performed subject to behavioral goals that include:
providing speech output including audible renditions of the responses when spoken to by the user;
asking permission of the user before providing speech output based on delayed answers and notifications; and
allowing the user to (i) change subject and/or (ii) interrupt in the dialog.

10. The method of claim 8, wherein the step of managing the audible rendering of responses is performed in a delivery mode subject to selection by the user.

11. The method of claim 10, wherein the delivery mode is one ofan immediate delivery mode and a delayed delivery mode.

12. The method of claim 8, wherein the step of managing the audible rendering of the responses is based on dialog states that specify the current state of the dialog between the computer and the user.

13. The method of claim 8, wherein the response is an announcement of an event of interest to the user as determined by the computer.

14. A computer program product comprising:
a tangible computer usable program product for managing a dialog between a computer and a user of the computer; and
a set of computer program instructions embodied on the tangible computer usable program product, including instructions to:
receive responses generated by the computer, the responses including responses that can be spoken by a text to speech device, in response to spoken input from the user asynchronously received by the computer through the audio input device;
place the generated responses in a prioritized speak queue, the spoken input being interpreted by a reasoning facility which enables the spoken input to include questions by the user, the computer running multiple applications and the reasoning facility interpreting the spoken input in a manner that at least one of the multiple applications recognizes the interpreted spoken input; and
manage audible rendering of the responses from the prioritized speak queue through the audio, output device, prioritizing the audible rendering of the responses according to rules other than the order in which the responses are added to the prioritized speak queue and according to corresponding contexts in a context priority queue so that the user receives each response as part of an asynchronous dialog between the computer and the user, the dialog conducted in a polite non-interruptive manner that is subject to control by the user including allowing the user to change subjects and allowing the user to interrupt the dialog but not allowing the audible rendering of a response to interrupt the user.

15. The computer program product of claim 14, wherein the set of computer instructions comprises further instructions to manage the audible rendering of the responses subject to behavioral goals that include:
providing speech output including audible renditions of the responses when spoken to by the user;
asking permission of the user before providing speech output based on delayed answers and notifications; and
allowing the user to (i) change subject and/or (ii) interrupt in the dialog.

16. The computer program product of claim 14, wherein the set of computer instructions comprises further instructions to manage the audible rendering of responses based on a delivery mode subject to selection by the user.

17. The computer program product of claim 16, wherein the delivery mode is one of an immediate delivery mode and a delayed delivery mode.

18. The computer program product of claim 14, wherein the set of computer instructions comprises further instructions to manage the audible rendering of the responses based on dialog states that specify the current state of the dialog between the computer and the user.

19. The computer program product of claim 14, wherein the response is an announcement of an event of interest to the user as determined by the computer.

20. A computerized interface for managing a dialog between a computer and a user of the computer, the computer having an audio input device, a text input device, a visual output device, and an audio output device, the computerized interface comprising:

a prioritized speak queue for retaining responses generated by the computer the responses including responses that can be spoken by a text to speech device, in response to spoken input from the user asynchronously received by the computer through the audio input device, the spoken input being interpreted by a reasoning facility which enables the spoken input to include questions by the user, the computer running multiple applications and the reasoning facility interpreting the spoken input in a manner that at least one of the multiple applications recognizes the interpreted spoken input;

means for placing the generated responses in the prioritized speak queue; and means for managing audible rendering of the responses from the prioritized speak queue through the audio output device, the turn manager prioritizing audible rendering of the responses according to rules other than the order in which the responses are added to the prioritized speak queue and according to corresponding contexts in a context priority queue so that the user receives each response as part of an asynchronous dialog between the computer and the user, the dialog conducted in a polite non-interruptive manner that is subject to control by the user including allowing the user to change subjects and allowing the user to interrupt the dialog but not allowing the audible rendering of a response to interrupt the user.

* * * * *